United States Patent Office 2,971,387
Patented Feb. 14, 1961

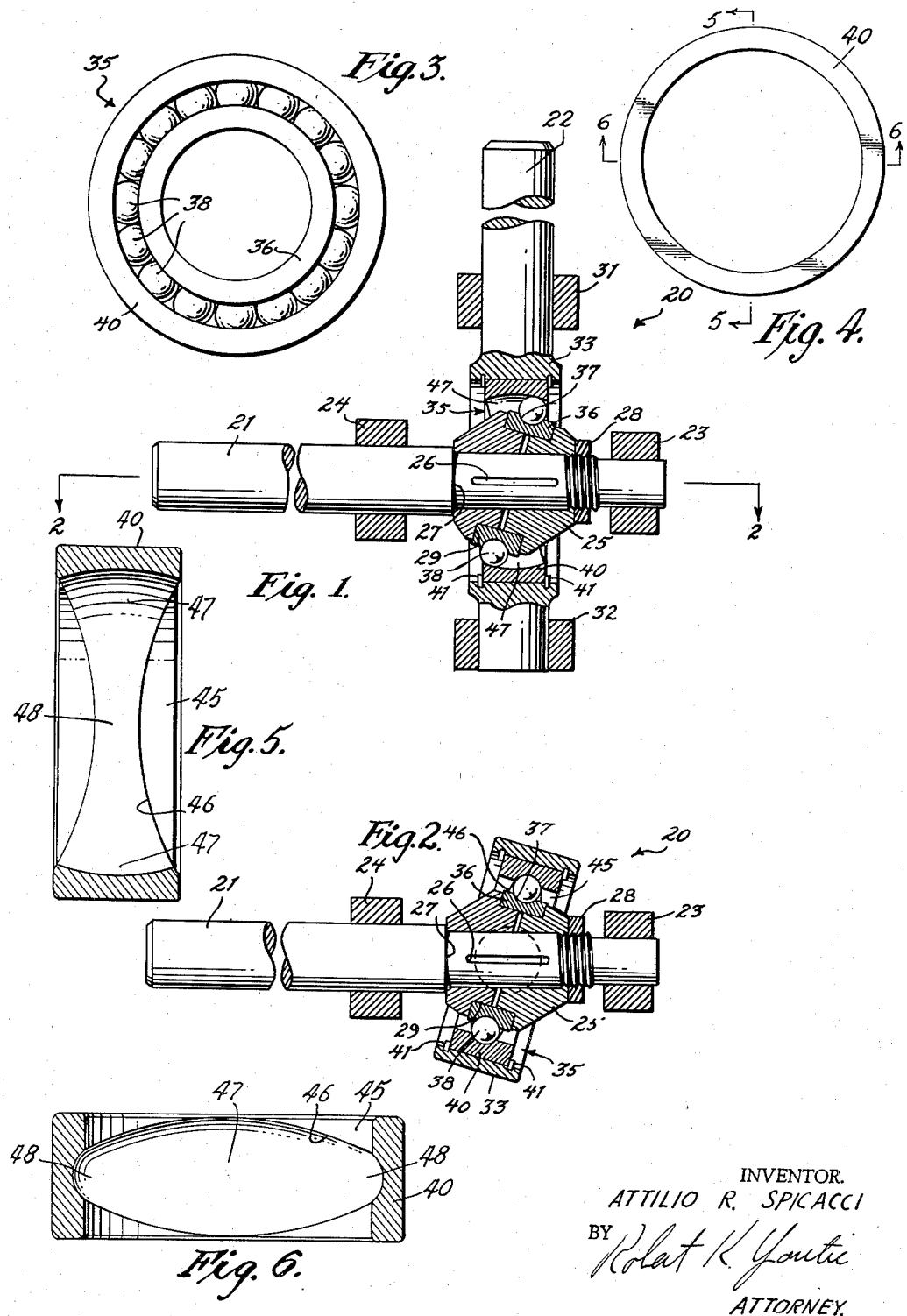

2,971,387

OSCILLATORY MECHANISM AND BEARING THEREFOR

Attilio R. Spicacci, 500 W. Chelten Ave., Philadelphia 44, Pa.

Filed Feb. 6, 1959, Ser. No. 791,629

13 Claims. (Cl. 74—60)

This invention relates generally to oscillatory mechanisms and bearings therefor.

It is well known that mechanisms for converting rotary motion to oscillatory motion find many applications in numerous and diverse mechanical parts. By way of example, it is sufficient to mention the cutter or sickle bar type of hay mower. These and many other oscillatory mechanisms are subject to certain limitations, say in operating speed, by high inertia forces of the oscillating parts, and they usually require relatively expensive structure to satisfactorily achieve the desired oscillation, which structure is subject to relatively rapid wear, breakage, and maladjustment.

Accordingly, it is one object of the present invention to provide an oscillatory mechanism which overcomes the above noted difficulties, consderably reducing the manufacturing costs, enabling operation at higher speeds, and which is more durable and reliable in use, having a minimum of wear and requiring only negligible maintenance.

It is another object of the present invention to provide a bearing assembly which is extremely simple in construction and of itself converts rotation to oscillation, to thereby considerably simplify the environmental structure, reducing the weight and size of the latter, to enable higher safe operating speeds.

Other objects of the present invention will become apparent upon reading the following specification and referring to the accompanying drawings, which form a material part of this disclosure.

The invention accordingly consists in the features of construction, and combinations and arrangements of elements, which will be exemplified in the following description, and of which the scope will be indicated by the appended claims.

In the drawings:

Figure 1 is an elevational view, partly in section, showing an oscillatory mechanism constructed according to the teachings of the present invention;

Figure 2 is a sectional view taken substantially along the line 2—2 of Figure 1, with the horizontal drive shaft thereof rotated 90°;

Figure 3 an elevational view showing a bearing of the oscillatory mechanism, somewhat enlarged and apart from the remainder of the mechanism;

Figure 4 is an elevational view showing an annular bearing element or outer race constructed in accordance with the teachings of the present invention;

Figure 5 is a sectional view taken substantially along the line 5—5 of Figure 4; and Figure 6 is a sectional view taken substantially along the line 6—6 of Figure 4.

Referring now more particularly to the drawings, and specifically to Figures 1 and 2 thereof, an oscillatory mechanism is there generally designated 20, and includes a rotary drive element 21 and oscillatory driven element 22. In the drawings, which are by way of illustration and without limiting intent, the drive element 21 consists of a shaft mounted for axial rotation by spaced journal bearings 23 and 24, and carrying intermediate the journal bearings a mounting hub 25. The mounting hub is circumposed about the drive shaft 21, being keyed as at 26 to the drive shaft for rotation therewith, or otherwise suitably fixed to the drive shaft, and may be of a sectional construction, as illustrated, the sections being retained on the drive shaft between a shoulder 27 formed on the shaft and a lock nut 28 circumposed about and in threaded engagement with the shaft. The sections of the hub 25 are configured so as to combine to define an outwardly facing annular groove 29 circumscribing the shaft 21 and located in a plane disposed at an oblique angle with respect to the axis of the drive shaft. More specifically, the external groove 29 of the hub 25 is located in a plane oblique to the axis of shaft 21 as seen in Figures 1 and 2, but normal to the shaft axis in a plane at 90° from the plane of Figures 1 and 2.

The oscillatory or driven member 22 is constituted of a shaft supported for axial oscillatory rotation by spaced journal bearings 31 and 32 and provided intermediate the bearings with an annular eye or ring 33 coplanar with and having a diameter coaxial with said driven shaft.

Operatively connected between the drive and driven shafts 21 and 22, and particularly between the hub 25 and ring 33 is a bearing assembly, generally designated 35. The bearing construction 35 includes an inner, annular bearing element or race 36 conformably received and clamped within the groove 29, so as to lie coplanar with the groove. The inner annular element or race 36 is provided on its external peripheral surface with an annular external groove 37 extending circumferentially about the inner race and of a constant cross-sectional configuration throughout its extent.

The external peripheral groove 37 of the inner race 36 may be of a partially circular cross-sectional configuration for conformably receiving an annular array of rollable elements or balls 38 circumferentially about the inner race. The inner race 36 and the balls 38, may of themselves be conventional in construction, and define an inner bearing construction of the assembly 35.

The bearing assembly 35 further includes an annular outer bearing element or race 40 which is conformably received in the eye or ring 33 of the oscillatory element 32, and held in position therein by retaining elements 41. The inner periphery or internal surface of the outer annular element or race 40 is in bearing reception with the rollable elements or balls 38, so that the balls are intermediate bearing elements located between and in bearing engagement with the inner and outer races. It will be appreciated that upon continuous, unidirectional angular movement or rotation of the drive shaft 21, the inner race 36 rotates in the manner of a swash-plate and further, that the rollable elements 38 may be considered as rotating in the same manner, except for rolling motion thereof.

The outer annular bearing element or race 40 is provided on its inner periphery or internal surface 45 with a specifically contoured groove 46 receiving and in bearing reception with the intermediate bearing elements or balls 38. The internal, annular groove 46 of the outer race 40 is configured to have alternately narrow and wide regions merging smoothly with each other, the wide and narrow regions each being two in number, so that the groove may be generally considered as of an hour-glass shape in development, say if the configuration were developed in a plane starting from one narrowmost region. Further, as best seen in Figures 4-6, the relatively wide pair of groove regions, designated 47, are located in diametrically opposed relation along the section line 5—5, while the relatively narrow pair of groove regions, designated 48, are located in diametrically opposed relation along the section line 6—6. Thus, the adjacent wide and narrow regions of groove 46 are spaced apart approximately 90° from each other. The cross-sectional configuration of the relatively narrow groove portions 48 may be such as to conformably receive outer portions of the intermediate rollable bearing elements or balls 38, say having substantially the same radius of curvature as the balls, while the relatively wide groove portions 47 have a radius of curvature in cross-section approximately equal to the maximum internal radius of the outer race, such radius lying in a central plane of the outer race in the illustrated embodiment. Between these regions of maximum and minimum groove width, the radius of curvature in cross-section varies gradually and continuously between its maximum at the relatively wide groove regions and minimum at the relatively narrow groove regions, this being another way of defining the configuration of the internal annular groove 46.

Referring again to the assembly of Figures 1 and 2, it will be noted that the outer race 40 is seated in the ring 33 of shaft 22 with its larger or wider groove regions 47 located along a diameter coaxial with the rotary axis of the driven shaft, the relatively narrow groove regions 48 being located on a diameter of the race 40 transverse or normal to the driven shaft axis.

It will now be appreciated that upon operation of the drive shaft 21 in a continuous unidirectional rotational movement, the inner bearing element or race 36, and for certain kinematic considerations the intermediate bearing elements or balls 38, may be assumed to rotate with the drive shaft at an angle oblique to the latter. The inner race 36 and balls 38 may then be considered together as an inner bearing construction having the motion of a swash-plate. Thus, one diameter of the inner bearing construction 36, 38, the diameter normal to the paper in Figures 1 and 2, will rotate in a coplanar or flat plane normal to the axis of shaft 21. The balls 38 along this diameter of the inner bearing construction 36, 38, will of course cause no oscillation of the driven shaft as they move in a plane coaxial with the latter shaft. However, the diameter of the inner bearing construction 36, 38 angularly spaced 90° from the above discussed diameter, extends oblique to the axes of both shafts 21 and 22, generating upon revolution a pair of cones connected together at their apices. More specifically, the oblique diameter of the inner bearing construction is that lying in the plane of the paper in Figures 1 and 2. Obviously, balls 38 lying along this oblique diameter will effect oscillation of the outer race 40, and hence of the driven shaft 22. In particular, the balls along the oblique diameter of the inner bearing construction will effect oscillatory rotation of the driven shaft 22 upon their movement into and out of the relatively narrow groove regions 48, one extreme position of such oscillatory movement being in Figure 2. Upon passage of the balls 38 along the oblique axis of the inner bearing construction 36, 38 through the relatively wide groove regions 47, the condition of Figure 1, the driven shaft 22 is in its midpoint or center of oscillation. Of course, this resultant rotary oscillation of the driven shaft 22 is positively constrained at all times by the balls 38 located in and conformably received by the relatively narrow groove portions 48.

From the foregoing it is seen that the present invention provides a highly unique bearing construction which fully accomplishes its intended objects and are well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A rotary to oscillatory mechanism comprising a pair of inner and outer annular elements, one of said annular elements being mounted for rotation about an axis extending centrally and obliquely through said one annular element, the other annular element being mounted for oscillation about a generally diametral axis intersecting with said oblique axis, and engaging means between said annular elements effecting oscillatory movement of said other element upon rotation of said one element.

2. A mechanism according to claim 1, said engaging means including intermediate bearing means between said annular elements and rotatable with said one annular element, said other annular element being in bearing relation with said intermediate bearing means and configured for said bearing engagement to constrain said other element to oscillatory movement upon rotation of said one element.

3. A mechanism according to claim 2, said bearing means comprising an annular array of rollable elements interposed between said annular elements, the configuration of said other annular element for said bearing engagement being defined by an annular groove having alternately narrow and wide regions spaced approximately 90° apart and smoothly merging into each other.

4. A rotary to oscillatory mechanism comprising a rotary element, an inner bearing element carried by said rotary element for rotation therewith and disposed at an oblique angle with respect to the axis of said rotation, an oscillatory element mounted for oscillation about an axis transverse of the axis of said rotation, an outer bearing element carried by said oscillatory element for oscillation therewith, and at least one intermediate bearing element between and operatively connected to said inner and outer bearing elements for effecting oscillatory movement of the latter upon rotation of the former.

5. A mechanism according to claim 4, said outer bearing element having said internal configuration receiving said intermediate bearing element and constraining said outer bearing element to oscillatory movement upon rotation of said inner bearing element.

6. A mechanism according to claim 4, said intermediate bearing element being of generally annular configuration and located in a plane oblique to the axis of rotation of said rotary element for rotation about said axis with said inner bearing element, and said outer bearing element having an internal configuration receiving the annular configuration of said intermediate bearing element to constrain said outer bearing element to oscillatory movement upon rotation of said inner bearing element.

7. A mechanism according to claim 4, wherein the internal configuration of said outer bearing element is of a repeated generally hour-glass shape in development.

8. A rotary to oscillating mechanism comprising a rotary element, a first bearing construction of annular configuration circumposed about said rotary element in a plane oblique to the axis of rotation of said rotary element and rotatable therewith, an oscillatory element mounted for oscillation about an axis transverse of the axis of rotation of said rotary element, a second bearing construction carried by said oscillatory element for oscillation therewith and circumposed about said first bearing construction, said second bearing construction being internally configured to receive said first bearing construction and effect oscillatory movement of said oscillatory element upon rotation of said rotary element.

9. A mechanism according to claim 8, said first bearing construction comprising an inner race fixedly circumposed about said rotary element in a plane oblique to the axis of rotation of said rotary element, and rollable elements arranged in an annular array extending about said inner race, said second bearing construction comprising an outer race fixed to said oscillatory element and encompassing said annular array of rollable elements in bearing engagement therewith.

10. A mechanism according to claim 9, the internal configuration of said second bearing construction rollably receiving said rollable elements and being defined by an annular groove having alternately located narrow and wide regions merging smoothly with each other and spaced approximately 90° from each other.

11. A bearing assembly comprising inner and outer annular elements, an engaging means between said annular elements, one of said annular elements being provided with an annular groove arranged in bearing reception with said engaging means and having alternately located narrow and wide regions spaced approximately 90° apart and merging smoothly with each other, whereby said inner and outer elements are rotatable relative to each other and pivotable relative to each other about an axis extending between opposite relatively narrow regions of said groove.

12. A bearing assembly comprising a pair of inner and outer annular bearing elements, an annular array of rollable bearing elements interposed between said inner and outer annular bearing elements, one of said annular bearing elements being formed with an annular groove of substantially constant cross section in bearing reception with said rollable elements, and the other of said annular bearing elements being formed with an annular groove in bearing reception with said rollable elements and having alternately narrow and wide regions spaced apart approximately 90° and merging smoothly together, whereby said annular bearing elements are axially rotatable relative to each other and pivotable relative to each other about a diametral axis.

13. In a bearing, the combination comprising an inner bearing component having an external race groove, an outer bearing component having an internal race groove, a plurality of rolling elements in bearing engagement with said race grooves; one of said bearing components having a race groove of a cross-sectional configuration substantially conforming to the bearing surfaces of said rolling elements, the other bearing component having a race groove of a cross-sectional configuration at one diameter substantially conforming to the bearing surfaces of said rolling elements and at all other diameters a configuration affording a substantial angular movement of said other bearing component relative to said one bearing component about said one diameter while maintaining said rolling elements in bearing engagement with said races within said angular movement.

References Cited in the file of this patent

UNITED STATES PATENTS

| | | |
|---|---|---|
| 265,411 | Hartmann | Oct. 3, 1882 |
| 1,997,903 | Hackethal | Apr. 16, 1935 |
| 2,004,649 | Booth et al. | June 11, 1935 |
| 2,434,463 | Klein | Jan. 13, 1948 |
| 2,459,406 | Anderson | Jan. 18, 1949 |
| 2,814,915 | Messerschmidt | Dec. 3, 1957 |

FOREIGN PATENTS

| | | |
|---|---|---|
| 951,855 | Germany | Oct. 18, 1956 |